UNITED STATES PATENT OFFICE.

SAMUEL PEACOCK, OF PHILADELPHIA, PENNSYLVANIA, ASSIGNOR, BY MESNE ASSIGNMENTS, TO AGRICULTURAL RESEARCH CORPORATION, OF NEW YORK, N. Y., A CORPORATION OF NEW YORK.

PROCESS OF DECOMPOSING ALKALI-METAL SILICATES.

1,134,413. Specification of Letters Patent. Patented Apr. 6, 1915.

No Drawing. Application filed April 18, 1914. Serial No. 832,812.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Decomposing Alkali-Metal Silicates; and I do hereby declare the following to be a full, clear, and exact description of the invention, such as will enable others skilled in the art to which it appertains to make and use the same.

This invention relates to a process of separating potassium, sodium and aluminum from their silicate combinations, while at the same time producing volatile carbo-nitrids of these metals which may be utilized in the production of other compounds, as well as producing an amorphous silicon carbid, all as will appear below.

With these and other objects in view the invention consists in the novel steps constituting my process, as well as the novel products thereof, all as will be more fully hereinafter disclosed and particularly pointed out in the claims.

In carrying out my process I finely divide a potassium bearing silicate rock such as feldspar or such as a natural occurring ortho-clase or microclin, having a formula such as $KAlSi_3O_8$, and mix the same with a suitable quantity of finely divided carbon such as ground coke, coal dust or other form of fuel carbon. The mixed carbon and silicate is then heated to a temperature of about 1500° C. to 1600° C. in an atmosphere containing nitrogen, but containing substantially no chemically active oxygen, when it is found that potassium and sodium as well as aluminum are separated in the form of volatile carbo-nitrids, such as $K_2CN_2$, $Na_2CN_2$ and $Al_2C_3N_6$ respectively. The silicon remaining in the furnace residue is converted into silicon carbid.

In the case of a pure microclin, I have reason to believe the reaction will be as follows:—

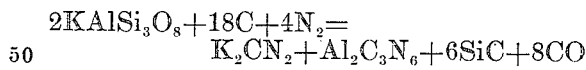
$$2KAlSi_3O_8 + 18C + 4N_2 = K_2CN_2 + Al_2C_3N_6 + 6SiC + 8CO$$

A small proportion of the silicon will also combine with nitrogen.

I have discovered that the product produced is largely volatile, but that a small proportion thereof, occurs in the solid form. The proportion of volatile to solid products depends in a measure upon the pressures employed; a pressure below the atmosphere producing a relatively larger proportion of volatile products than a pressure above the atmosphere for the same period of reaction.

The decomposition of the silicate is greatly facilitated by maintaining low partial pressures of the products of the reaction. This may be accomplished by carrying out the process in a gas tight furnace through which the mixture is continuously fed, while nitrogen or nitrogen containing gas is admitted at the discharge end and continuously drawn through and out of the furnace at the feed end, or vice versa, and if desirable a vacuum pump at the furnace gas exit may be used to maintain the partial pressures at any desired values, say from 200 to 300 millimeters of mercury. But I prefer to maintain low partial pressures by simply flushing the furnace continuously or at intervals during the process with nitrogen or producer gas.

I am not as yet able to say with certainty just what atomic linkages are involved in the volatile products actually produced, but from the presence of combined carbon and combined nitrogen, and from other considerations, I believe the normal valencies persist, and that the above compounds are the ones produced in the greatest quantities, although there may be others present in smaller proportions. That is to say, the reaction products seem to be limited to the following: carbon monoxid CO; potassium carbo-nitrid $K_2CN_2$; sodium carbo-nitrid, $Na_2CN_2$; aluminum carbo-nitrid $Al_2C_3N_6$; and silicon carbids. When the temperature is high and the partial pressures kept low by flushing with nitrogen gas, most of the furnace products are found to be carbon monoxid, CO, and the above carbo-nitrids, and silicon carbids.

It will be observed from the foregoing that at the comparatively low temperature mentioned I am enabled to separate from its associated compounds the potassium sodium and aluminum in silicates and to disperse them. The carbo-nitrids thus obtained may be placed in an autoclave, and treated with water at 200° C., when the following reactions will take place:

1. $Na_2CN_2 + 3H_2O = Na_2CO_3 + 2NH_3$
2. $K_2CN_2 + 3H_2O = K_2CO_3 + 2NH_3$
3. $Al_2C_3N_6 + 9H_2O = Al_2O_3 + 3CO_2 + 6NH_3$

The volatile carbo-nitrids thus formed may be led from the furnace and condensed in a suitable chamber prior to being treated with hot water, or they may be led directly into water and subjected to a temperature of 200° C. when the evolved ammonia may be suitably recovered. In such case the alkali metals will form carbonates as indicated in the above equations which may be recovered in any suitable manner, and the alumina will be precipitated in a pure form and constitute a valuable by-product. The furnace residue contains silicon carbid in an amorphous state which has industrial uses in reducing refractory oxids.

It is obvious that those skilled in the art may vary the details of my process without departing from the spirit thereof, and therefore I do not wish to be limited to the above disclosure except as may be required by the claims.

What I claim is:

1. The process of separating potassium, sodium and aluminum from their silicate combinations which consists in providing a finely divided mixture of carbon and a mineral containing said metals; and heating the same in an atmosphere of nitrogen to a temperature sufficient to produce volatile compounds containing said metails combined with carbon and nitrogen while maintaining the partial pressure of the reaction products below 350 millimeters of mercury, substantially as described.

2. The process of simultaneously producing volatile carbo-nitrids of an alkali metal and aluminum which consists in mixing carbon with a mineral containing said metals; and heating the same in an atmosphere of nitrogen to a temperature sufficient to produce said carbo-nitrids; and suitably recovering the same, substantially as described.

3. The herein new composition of matter consisting of alkali metal and aluminum carbo-nitrids the same being volatile at their temperatures of formation, but capable of being condensed in the form of a powder, or of forming ammonia when treated with water at 200° C. as well as alkali-metal carbonates and alumina, substantially as described.

In testimony whereof I affix my signature in presence of two witnesses.

SAMUEL PEACOCK.

Witnesses:
T. A. WITHERSPOON,
FRANCES SIEBEL.